United States Patent [19]

Mulders

[11] 4,363,608

[45] Dec. 14, 1982

[54] THRUST BEARING ARRANGEMENT

[75] Inventor: Jan A. Mulders, Etten-Leur, Netherlands

[73] Assignee: Borg-Warner Corporation, Chicago, Ill.

[21] Appl. No.: 255,946

[22] Filed: Apr. 20, 1981

[51] Int. Cl.³ .................. F04B 21/00; F16C 19/30
[52] U.S. Cl. ............................. 417/424; 308/160; 308/227
[58] Field of Search ............. 417/424; 308/227, 160, 308/26, 230, 231, 229

[56] References Cited

U.S. PATENT DOCUMENTS

| 3,814,486 | 6/1974 | Schürger | 308/160 |
| 3,829,179 | 8/1974 | Kurita et al. | 308/160 |
| 4,033,647 | 7/1977 | Beavers | 308/227 |
| 4,240,683 | 12/1980 | Crase | 308/227 |

Primary Examiner—Lenard A. Footland
Attorney, Agent, or Firm—Aubrey L. Burgess

[57] ABSTRACT

A thrust bearing assembly especially adaptable for use with a centrifugal pump and located between the impeller and the impeller driving means and constructed of multiple bearings, each of which is preloaded to a certain value such that under conditions of no upwardly directed thrust load, the upper and lower bearings share a load applied to the upper bearing while a middle bearing is subject only to its preload, and under upwardly directed thrust load conditions, the upper and middle bearings share the upwardly directed thrust load while the lower bearing carries its preload.

5 Claims, 3 Drawing Figures

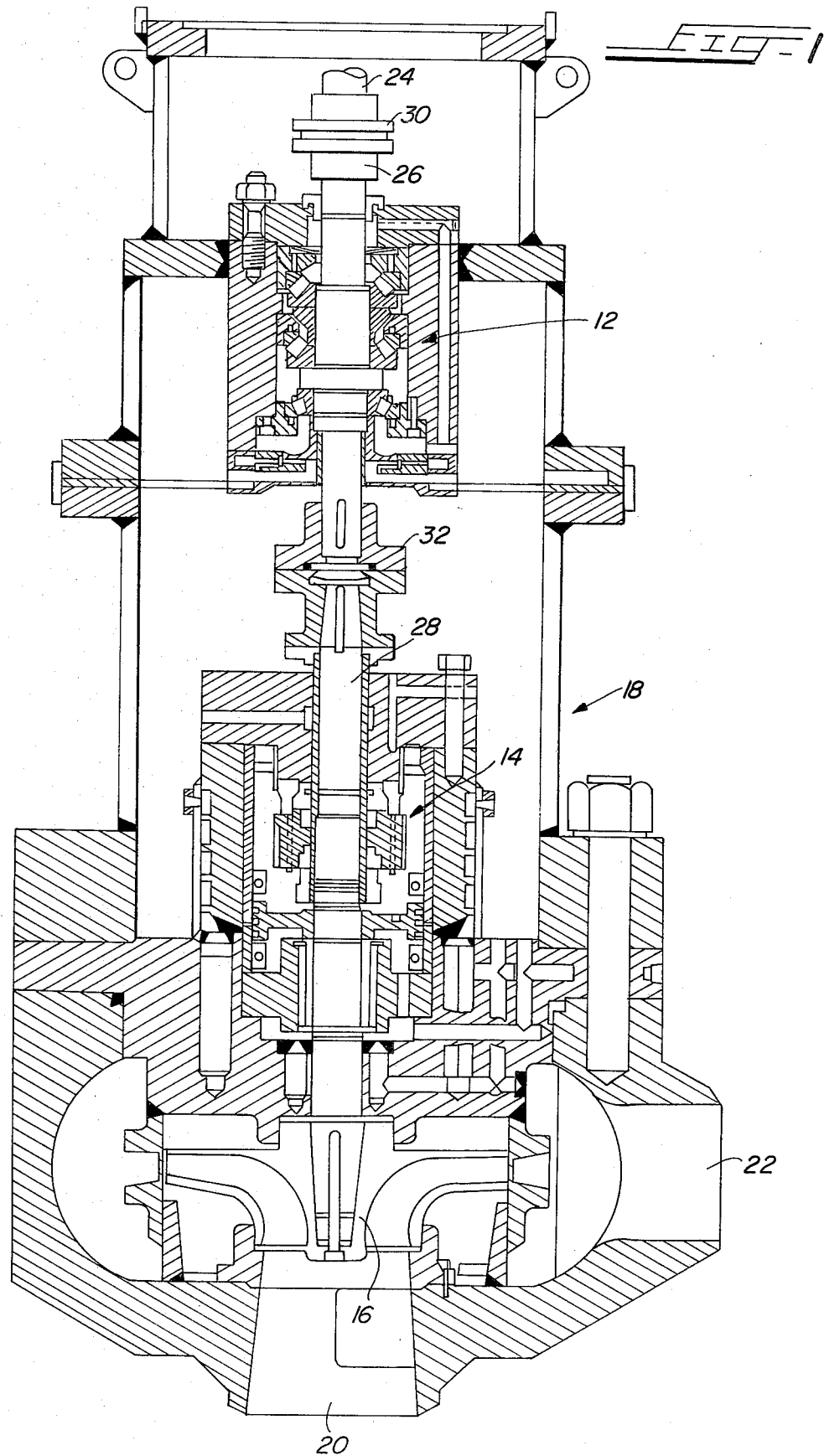

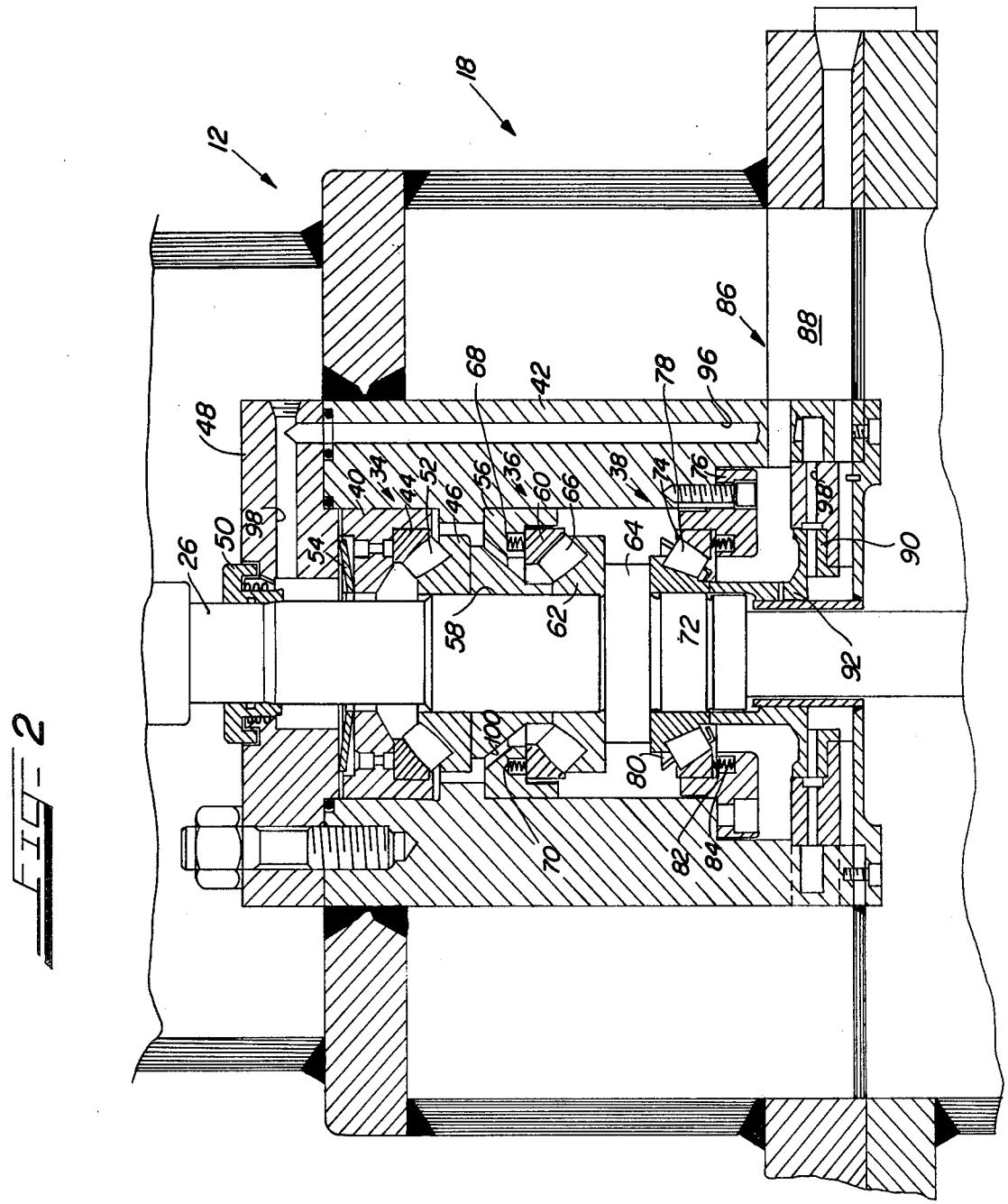

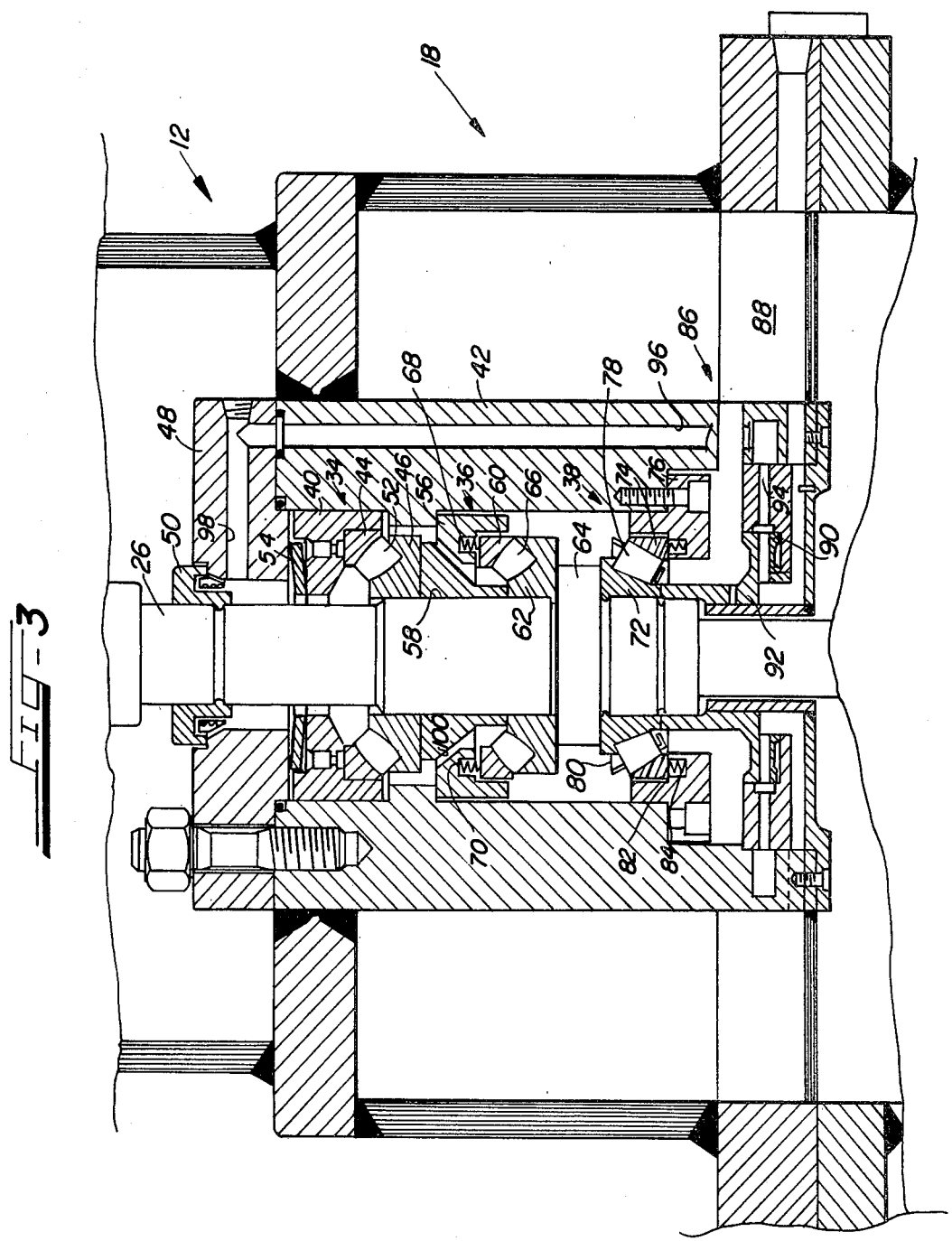

THRUST BEARING ARRANGEMENT

BACKGROUND OF THE INVENTION

Multiple thrust bearing arrangements to carry imposed loads on a substantially vertical shaft are well known in the art. As the loads on a shaft are increased, it becomes necessary to use relatively large thrust bearings which require considerable space. It has been proposed to provide tandem thrust bearings arranged and constructed to divide the load between the bearings, such as described in U.S. Pat No. 4,033,647 granted July 5, 1977. While this arrangement is satisfactory for the submersible pump construction shown, it will not carry the thrust loads imposed by large centrifugal pumps wherein roller bearings are used in the thrust bearing arrangement.

THE INVENTION

The invention herein to be described relates to multiple thrust bearing arrangements adapted for use with vertical shafts and especially for use with centrifugal pumps which impose an upwardly directed thrust load on the shaft. The bearing arrangement is generally located between the pump impeller and the prime mover therefor, the latter being above the former.

More particularly, the thrust bearing arrangement of this invention comprises an upper, a middle and a lower bearing, each surrounding a shaft and each spaced from one another. Multiple coil springs are provided to preload the middle and lower bearings, the load being essentially that to maintain race-roller contact. A Belleville spring is provided to preload the upper bearing. The load on the upper bearing provided by the Belleville spring is far in excess of that on the middle and lower bearings. The Belleville spring and the bearing arrangement are constructed and arranged such that the upper bearing shares its load with the lower bearing under no upwardly directed thrust load conditions; the middle bearing continues to carry its preload. Under upwardly directed load conditions the lower bearing preload is reduced by the amount off external thrust and the upper bearing carries the thrust. Under such condition, the middle bearing is not loaded until the external upthrust is greater than the Belleville spring force.

At that time, the middle bearing will begin to be loaded by the amount of external thrust in excess of the Belleville spring force. By choosing a Belleville spring to provide a force equal to the load rating of the bearing, the arrangement insures that the upper bearing is never overloaded and the middle bearing only carries the thrust which is in excess of Belleville spring load, thus making the assembly capable of carrying thrust loads which are twice that of the rating of each individual bearing.

The assembly of this invention can operate with thrust in either direction and is preloaded to safely operate through the transition. The assembly insures the load sharing between the upper and middle bearings with out the necessity for accurate shimming as is generally required on other tandem or multiple thrust bearing assemblies.

THE DRAWINGS

FIG. 1 is a section through a pump assembly incorporating the thrust bearing arrangement of this invention with the driver indicated by symbol;

FIG. 2 is an enlarged sectional view through the thrust bearing of this invention under full upthrust conditions; and FIG. 3 is an enlarged sectional view through the thrust bearing of this invention under downthrust or stationary conditions.

DETAILED DESCRIPTION

Looking now at the drawings, a pump arrangement is illustrated in FIG. 1 which comprises, from top to bottom, a prime mover 10, the thrust bearing arrangement 12 of this invention, a mechanical seal assembly 14 and an impeller 16. The pump arrangement is housed in a multiple part housing 18 with a bottom inlet 20 and an outlet 22, the parts 10, 12, 14 and 16 being interconnected by shafts 24, 26 and 28. The shafts 24 and 26 are connected by a flange coupling 30, and the shafts 26 and 28 are connected by a flange coupling 32. This arrangement provides a positive drive from the prime mover 10 to the impeller 16. In that the invention comprises the thrust bearing arrangement 12 which is also illustrated in FIGS. 2 and 3 on an enlarged scale, the remaining description will be primarily directed to the inventive subject matter.

The thrust bearing arrangement 12 comprises an upper bearing 34, a middle bearing 36 and a lower bearing 38. The upper bearing 34 comprises collar 40 surrounding shaft 26 and received in an inner housing part 42, the collar receiving an upper raceway 44. A lower raceway 46 is received around an enlarged portion of shaft 26. The top of the inner housing part 42 is closed by a closure member 48 bolted to the housing part 42 and the member 48 is sealed to the shaft 26 by a seal member 50. A plurality of spherical rollers 52 are disposed between the races 44 and 46. A Belleville spring 54 is located between the closure member 48 and the collar 46 and applies a load to the bearing 34.

The lower raceway 46 abuts a second collar 56 which surrounds the aforesid enlarged part of the shaft 26, the collar 56 abutting a shoulder 58 of the inner housing part 42 when the thrust bearing is in its FIG. 2 condition but spaced therefrom when in its FIG. 3 condition.

An upper raceway 60 for the middle bearing 36 is received in the collar 56 and a lower raceway for the bearing 36 is disposed around the aforesaid enlarged part of the shaft 26, the lower raceway 62 resting at its bottom on a disc-like shaft portion 64. A plurality of spherical rollers 66 are located between the raceways 60 and 62. The bearing 36 is preloaded by a plurality of coil springs 68 received in pockets 70 in the collar 56 and acting against the upper raceway 60.

The lower bearing 38 comprises an inner raceway 72 surrounding the shaft 26 with an upper surface abutting the disc-like shaft portion 64 and an outer raceway 74 supported within a collar 76 fixed to the inner housing 42. A plurality of tapered rollers 78 spaced by a cage 80 are located between the raceways 72 and 74. The bearing 38 is preloaded by a plurality of coil springs 82 received in pockets 84 in the collar 76.

While the upper and middle bearings are illustrated and described as being spherical roller bearings, it is to be understood that tapered roller bearings could be used without departing from the spirit of the invention. Also, the lower bearing could be a spherical roller bearing if desired. Also, while not shown, cages are provided to space the rollers in the upper and middle bearings.

A lubrication system 86 is provided for the thrust bearing arrangement. The system 86 comprises a lubricant reservoir 88, a lubricant impeller 90 rotatably secured to the shaft 26 having a sleeve 92 abutting the raceway 72 of the bearing 38 which discharges lubricant into connected passageways 94, 96 and 98, the passageway 96 being located in the inner housing 42.

The passageway 98 discharges lubricant above the upper bearing 34, so that it can flow downwardly to the middle bearing 36, flowing through passageways 100 in the upper raceway 60 and back to the reservoir 88 through the lower bearing 38.

The Belleville spring 54 preloads the upper bearing 34 to a predetermined value, as for example 13,000 pounds, while the springs 68 and 82 preload the bearings 36 and 38, respectively, to a predetermined value of 300 pounds. The preload on the middle and lower bearings 36 and 38, respectively, essentially maintains race-roller contact. Under no thrust load conditions, the load of the Belleville spring is transmitted not only to the upper bearing but also the lower bearing, as in FIG. 3, such that the upper and lower bearings share the load. Thus the center bearing runs only on its preload provided by the coil springs. When downthrust is applied, the lower bearing will carry it, its load increasing to preload plus external load while the upper bearing continues to run preloaded by the Belleville spring.

As upthrust is applied, the lower bearing preload is reduced by the amount of external thrust and the upper bearing carries the thrust. The middle bearing is not loaded until such time that the external upthrust is greater than the Belleville spring force.

At that time, the middle bearing will begin to be loaded by the amount of external thrust in excess of Belleville spring force. If the Belleville spring force is equal to the load rating of the bearing, the arrangement insures that the upper bearing is never overloaded and the middle bearing carries the thrust which is in excess of Belleville spring load. The assembly is thus capable of carrying thrustloads which are on the order of twice that of the rating of each individual bearing.

For example, the upthrust goes under normal conditions to 26,000 pounds, the Belleville spring will keep pushing down with its positive 13,000 pound load. The center bearing will carry all load above 13,000 pounds until a maximum load of 13,000 pounds is carried, which totals 26,000 pounds. The lower bearing will then be carryinhg only its preload of 300 pounds.

I claim:

1. A generally vertically arranged thrust bearing assembly adapted to operate under conditions which vary from no upwardly directed thrustload to an upwardly directed thrustload, said thrust bearing assembly being operatively associated with a rotating unit and which comprises:
   an upper, middle and lower bearing, each spaced from the others;
   means to preload each of the middle and lower bearings to apply a first-value load thereto; and
   means to preload the upper bearing to apply a second and higher value load thereto;
   said bearing assembly being so constructed and arranged that said last-named means transmitts its load to said lower bearing under no upwardly directed thrust load conditions such that said lower bearing shares the load of said upper bearing while said middle bearing continues to carry its preload, and said middle and upper bearings carry the load under the upwardly directed load conditions while at the maximum upwardly load conditions the lower bearing carries only its preload.

2. A thrust bearing assembly as recited in claim 1, wherein said spaced bearings are roller bearings.

3. A thrust bearing assembly as recited in claim 1, wherein coil springs apply said preload to said middle and lower bearings and a Belleville spring applies said preload to said upper bearing.

4. A vertical pump assembly comprising an impeller for pumping fluid from an intake to an outlet and a motor for driving said impeller, and a thrust bearing arrangement located between said impeller and said motor, said thrust bearing arrangement comprising
   an upper, middle and lower bearing, each spaced from the others;
   means to preload each of the middle and lower bearings to apply a first-value load thereto; and
   means to preload the upper bearing to apply a second and higher value load thereto;
   said bearing assembly being so constructed and arranged that said last-named means transmitts its load to said lower bearing under no upwardly directed thrust load conditions such that said lower bearing shares the load of said upper bearing while said middle bearing continues to carry its preload, and said middle and upper bearings carry the load under the upwardly directed load conditions while at the maximum upwardly load conditions the lower bearing carries only its preload.

5. A pump assembly as recited in claim 4 wherein said bearings are roller bearings and further comprising coil springs to apply the preload to said middle and lower bearings and a Belleville spring to apply the preload to said upper bearing, the preload to said upper bearing being of greater value than the preload to said middle and lower bearings.

* * * * *